United States Patent [19]
Koeppen

[11] Patent Number: 5,761,667
[45] Date of Patent: Jun. 2, 1998

[54] METHOD OF OPTIMIZING DATABASE ORGANIZATION USING SEQUENTIAL UNLOAD/LOAD OPERATIONS

[75] Inventor: Christian B. Koeppen, Houston, Tex.

[73] Assignee: BMC Software, Inc., Houston, Tex.

[21] Appl. No.: 693,726

[22] Filed: Aug. 7, 1996

[51] Int. Cl.⁶ .................................................. G06F 7/00
[52] U.S. Cl. .................. 707/101; 707/8; 707/100; 707/200; 711/129; 711/173
[58] Field of Search .................................. 707/101, 102, 707/100, 103, 8, 200; 711/129, 173

[56] References Cited

U.S. PATENT DOCUMENTS

| | | | |
|---|---|---|---|
| 4,037,205 | 7/1977 | Edelberg et al. | 711/110 |
| 5,408,654 | 4/1995 | Barry | 707/101 |
| 5,442,784 | 8/1995 | Powers et al. | 707/102 |
| 5,517,641 | 5/1996 | Barry et al. | 707/101 |
| 5,522,068 | 5/1996 | Berkowitz | 707/101 |
| 5,551,020 | 8/1996 | Flax et al. | 707/101 |
| 5,566,333 | 10/1996 | Olson et al. | 707/102 |
| 5,596,747 | 1/1997 | Katabami et al. | 707/101 |
| 5,630,125 | 5/1997 | Zelleger | 707/103 |
| 5,659,736 | 8/1997 | Hasegawa et al. | 707/100 |
| 5,659,743 | 8/1997 | Adams et al. | 707/205 |

*Primary Examiner*—Thomas G. Black
*Assistant Examiner*—Jean R. Homere
*Attorney, Agent, or Firm*—Arnold, White & Durkee

[57] ABSTRACT

A method of reorganizing an IMS database. The method creates, in a storage device, a header data structure containing information about the size and key structure of the database. Next, the number of sequential files to be used for temporary storage of data from the database and the desired number of parallel unload processes to be used in unloading the database are determined. Then, the desired number of unload processes are initiated. These unload processes copy data from the IMS database to one or more sequential files so that hierarchically-related data in the database is copied in sequence. Next, a storage space to contain the IMS database is provided and address ranges of the storage space to the sequential files are assigned. Finally, a plurality of concurrent load processes are initiated. These load processes write data from the specified sequential files to the storage space at the respective address ranges assigned to the specified sequential files.

16 Claims, 5 Drawing Sheets

FRAGMENTED IMS DATABASE     SEQUENTIAL FILES     UNFRAGMENTED IMS DATABASE

```
UR1DSECT   DSECT
UR1LLZZ    DS      XL4         RDW
UR1SEGCO   DS      X           SEGMENT CODE (X'00')
UR1RCTYP   DS      X           RECORD TYPE (X'01')
UR1RECLN   DS      H           USER RECORD LENGTH
UR1DBDNM   DS      CL8         DBDNAME
UR1FLAG0   DS      X           DATABASE ORGANIZATION
UR1FLAG1   DS      X           BMC FLAGS
UR1DATE    DS      CL6         DATE (YY.DDD)
UR1TIME    DS      CL8         TIME (HH:MM:22)
UR1FLAG2   DS      X           FLAG BYTE
*                  BIT 0 = DBD IS REGISTERED WITH DBRC
*                  BIT 1 = DATA BASE CONTAINS SECONDARY INDEX (S)
*                  BIT 2 = DATA BASE CONTAINS LOGICAL RELATIONSHIP(S)
*                  BIT 3 = DBD IS AUTHORIZED BY DBRC
*                  BIT 4 = DATA BASE CONTAINS SEGMENT EDIT/COMPRESSION ROUTINE
*                  BIT 5 = HIDAM PRIMARY INDEX IS ISAM/OSAM
*                  BIT 6 = DOS COMPATIBILITY SPECIFIED IN INDEX
*                  BIT 7 =
           DS      XL3         UNUSED
UR1END     EQU     *
UR1SIZE    EQU     *-UR1SEGCO
```

FIG. 3A

| | | | |
|---|---|---|---|
| UR3DSECT | DSECT | | |
| UR3LLZZ | DS | XL4 | RDW |
| UR3SEGCO | DS | X | SEGMENT CODE (X'00') |
| UR3RCTYP | DS | X | USER RECORD TYPE (X'03') |
| UR3RECLN | DS | H | USER RECORD LENGTH |
| UR3DDNAM | DS | CL8 | DDNAME |
| UR3LRECL | DS | H | RECORD LENGTH OF DS |
| UR3BLKSI | DS | H | BLOCK SIZE OF DS |
| UR3FLAG1 | DS | X | FLAGS |
| UR3FLAG2 | DS | X | FLAGS |
| UR3FLAG3 | DS | X | FLAGS |
| UR3DSGID | DS | X | DSGROUP NUMBER |
| UREDSNAM | DS | CL44 | DSNAME |
| UR3END | EQU | * | |
| UR3SIZE | EQU | *-UR3DSECT | |

FIG. 3B

| | | | |
|---|---|---|---|
| UR4DSECT | DSECT | | |
| UR4LLZZ | DS | XL4 | RDW |
| UR4SEGCO | DS | X | SEGMENT CODE (X'00') |
| UR4RCTYP | DS | X | USER RECORD TYPE (X'04') |
| UR4RECLN | DS | H | USER RECORD LENGTH |
| UR4LIMNO | DS | H | LIMIT NUMBER |
| UR4LIMMX | DS | H | HIGH LIMIT NUMBER |
| UR4LIMDD | DS | CL8 | DDNAME |
| UR4LIMLO | DS | XL256 | LOW LIMIT |
| UR4LIMHI | DS | XL256 | HIGH LIMIT |
| UR4END | EQU | * | |
| UR4SIZE | EQU | *-UR4DSECT | |

FIG. 3C

METHOD OF OPTIMIZING DATABASE ORGANIZATION USING SEQUENTIAL UNLOAD/LOAD OPERATIONS

BACKGROUND OF THE INVENTION

The invention relates to a method of reorganizing a database running under the well-known DL/1 database management system in the IBM Information Management System (IMS) software.

IMS

IMS is one of the oldest and most widely used database systems. It runs on, e.g., IBM mainframe computers under the MVS operating system. IMS is based on the hierarchical data model (discussed below). Queries on IMS databases are issued through embedded calls in the IMS database language DL/1.

Because performance is important in large databases, IMS allows the database designer a large number of options in the data definition language. The database designer defines a physical hierarchy as the database scheme. Several sub-schemes may be defined by constructing a logical hierarchy from the record types comprising the scheme. There are a variety of options available in the data definition language (block sizes, special pointer fields, etc.) that allow the database administrator to "tune" the system for improved performance.

Hierarchical Databases

As is well-known in the art, a hierarchical database consists of a collection of records that are connected with each other with links in a tree-like logical structure. Each record is a collection of fields (attributes), each of which contains only one data value. A link is an association between precisely two records. For example, consider a very simple database representing a customer-account relationship in a banking system that is shown in FIG. 1. There are two record types, customer and account. The customer record consists of three fields: name, street, and city. Similarly, the account record consists of two fields: number and balance.

Note that the set of all customers and account records are organized in the form of a rooted tree where the root of the tree is a dummy node. A hierarchical database is a collection of such rooted trees.

Unloading and Loading a Database

In an effort to protect valuable data in a database against computer system and/or disk failures, it is common to copy data from a randomly accessible storage device, such as a disk drive, to a sequential file, such as a tape. (For convenience the term "disk drive" is used here as a shorthand for randomly accessible storage devices; the standard IBM term is DASD, standing for Direct Access Storage Device.) This procedure is known as unloading a database.

While tapes are significantly less expensive than randomly accessible disk drives, access to data is much slower, since the tape must be read sequentially from the beginning. A large sequential file can be stored on multiple storage devices, such as multiple magnetic tapes, while still remaining a single (logical) sequential file.

In an effort to decrease the time of unloading large databases, it is common to unload databases on large multiprocessor and/or multitasking computers in parallel. See, for example, Chapter 7 of BMC's "Unload Plus Manual." In a parallel unload, multiple unload processes copy data from the database to multiple sequential files concurrently. The term concurrent, as it is commonly understood by those skilled in the art, includes processing that occurs within both a multiprocessor computer system and a single-processor multitasking computer system when the computer systems are running a plurality of processes.

Conversely, the process of copying data from a sequential file onto a pre-formatted randomly accessible storage device is called loading. In this case, the data is loaded in a format defined by the DL/1 database management system.

Reorganization

Another purpose of unloading and reloading a database is to reorganize the database for better performance. Reorganization is desirable because as information is added, updated, and deleted, the database becomes physically disorganized, decreasing operating efficiency. More I/O operations are needed to retrieve database information. When this occurs, database response time slows. Such a physically disorganized database is known as a fragmented database.

When data is unloaded from a database to a sequential device such as a tape, it is commonly unloaded in hierarchical sequential order. When the disk drive is reloaded with the data from the tape, the data corresponding to each root is physically grouped together in an ordered fashion. Because related data is grouped, the data can be accessed quickly. Thus, the performance of the database is increased. In addition, because related data is grouped together, it is possible to reclaim formally unusable space on a disk drive.

As the size and complexity of a database increases, reorganization processing time increases. Thus, there is a need for a method that rapidly and efficiently reorganizes a database.

SUMMARY OF THE INVENTION

In one illustrative embodiment, the invention relates to a method of reorganizing an IMS database. The method creates, in a storage device, a header data structure containing information about the size and key structure of the database. Next, the number of sequential files to be used for temporary storage of data from the database and the desired number of parallel unload processes to be used in unloading the database are determined. Then, the desired number of unload processes are initiated. These unload processes copy data from the IMS database to one or more sequential files so that hierarchically-related data in the database is copied in sequence. Next, a storage space to contain the IMS database is provided and address ranges of the storage space to the sequential files are assigned. Finally, a plurality of parallel load processes are initiated. These load processes concurrently write data from the specified sequential files to the storage space at the respective address ranges assigned to the specified sequential files. Any overflow is written to a special overflow area.

BRIEF DESCRIPTION OF THE DRAWINGS

FIG. 3(a) presents an example of a unload header data structure.

FIG. 3(b) presents an example of a header data structure that contains information about the size and key structure of an IMS database.

FIG. 3(c) presents an example of header data structure that contains the file description of the files that were unloaded in parallel.

DETAILED DESCRIPTION OF ILLUSTRATIVE EMBODIMENTS

An illustrative embodiment of a method in accordance with the invention is described below. In the interest of clarity, not all features of actual implementations are necessarily described in this specification. It will of course be appreciated that in the development of any such actual implementation, as in any such project, numerous programming decisions must be made to achieve the developers'specific goals and subgoals (e.g., compliance with system- and business-related constraints), which will vary from one implementation to another. Moreover, attention must, of course, be paid to proper programming practices for the environment in question. It will be appreciated that such a development effort might be complex and time-consuming, but would nevertheless be a routine undertaking for those of ordinary skill having the benefit of this disclosure.

Creation of a Header Data Structure

Figure 2:
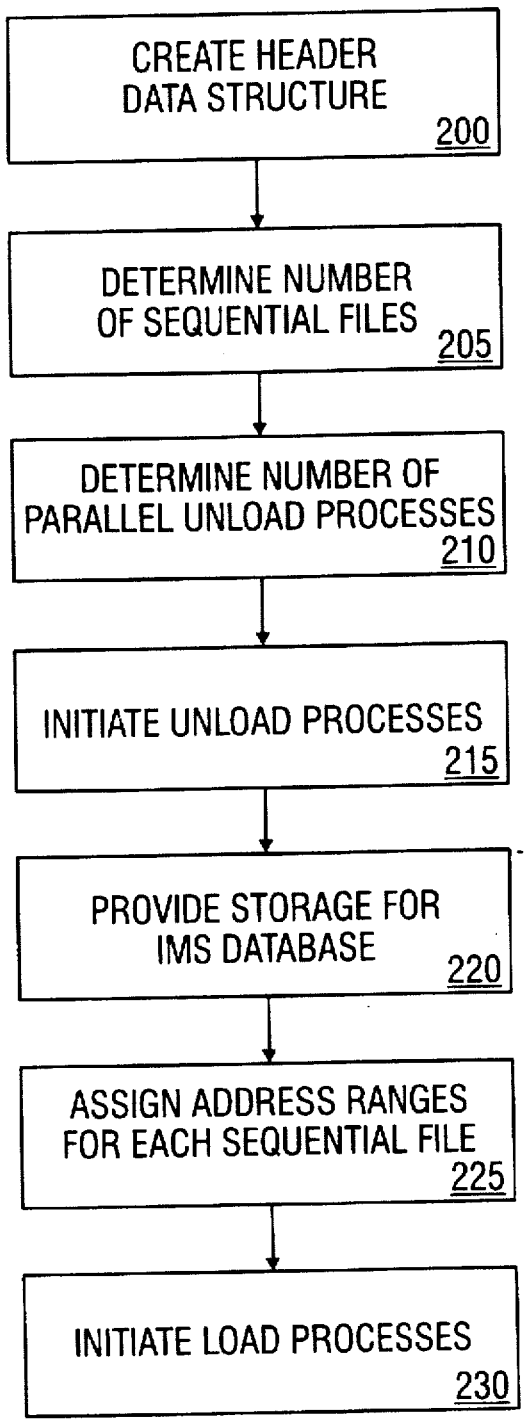
FIG. 2 is a flow diagram of a reorganization of an IMS database.

Referring to FIG. 2, the first step in reorganizing the IMS database is creating a header data structure at block 200. This header data structure will be used in determining where specific data should be written in the reorganized database. The header data structure is typically stored in a sequential storage device such as a magnetic tape. However, it may be stored in a disk drive as well. The header data structure contains information about the size and key structure of the database that will be unloaded. This header data structure is analogous to a map of the IMS file.

Several examples of header data structures that will be understood by those skilled in the art are presented in FIGS. 3(a), 3(b), and 3(c). FIG. 3(a) presents an example of a unload header data structure. FIG. 3(b) presents an example of a header data structure that contains information about the size and key structure of an IMS database. FIG. 3(c) presents an example of header data structure that contains the file description of the files that were unloaded in parallel.

Creation of a header data structure requires determining the hierarchical structure of the data within the IMS database. This may be done by consulting the IMS-maintained data set DBDLIB and the MVS-maintained data sets VTOC and MASTER CATALOG for the database. As known to those of ordinary skill, the above data sets contain information about the logical structure of the database. Using DBDLIB, VTOC, MASTER CATALOG and standard MVS operating system facilities, the size of the data set(s) in the database may be determined.

Creation of the header data structure can be thought of as analogous to surveying the contents of a file room before emptying it out for reorganization. Before any of the contents are moved, the contents are documented.

Determination of the Number of Sequential Files

Again referring to FIG. 2, the next step after creating the header data structure is to determine the number of sequential files to be used for temporary storage of data from the database at block 205. Determining the number of sequential files may be accomplished in a variety of ways. For example, the number may be user-specified, if for some reason a database administrator desires to use a specific number of sequential files. Alternatively, the number of sequential files can be determined based on the aggregate size of the data in the database. This determination allows approximately equal size sequential files. The number of sequential files may be limited to a maximum number, if desired, to avoid excessive operating system overhead and disk contention.

Referring to the previously discussed file room analogy, the sequential files may be associated with boxes used to temporarily store the contents of the file room. The number of boxes used in the reorganization may be selected based on the size of the files in the file room or be specified based on the number of available boxes.

Determination of the Number of Parallel Unload Processes

The number of parallel unload processes is determined at block 210. The number of parallel unload processes may be user specified or determined consistent with the particular computer performing the reorganization of the IMS database. The number of parallel unload processes need not be equal to the number of sequential files.

Referring again to the file room analogy, the number of parallel unload processes can be associated with the number of clerks used to transfer the file room contents to the boxes. This number may be selected based on the number of files in the file room or be selected based on the number of clerks available.

Initiation of the Parallel Unload Processes

Figure 4A:
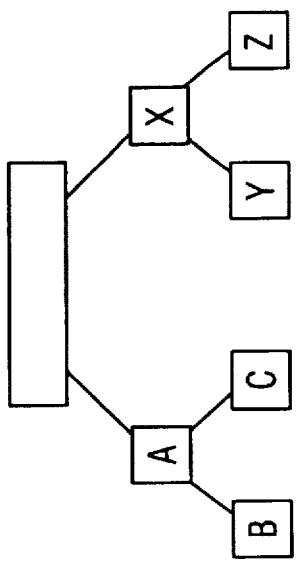
FIG. 4(a) is a high level block diagram of a simple hierarchical database.
Figure 4B:
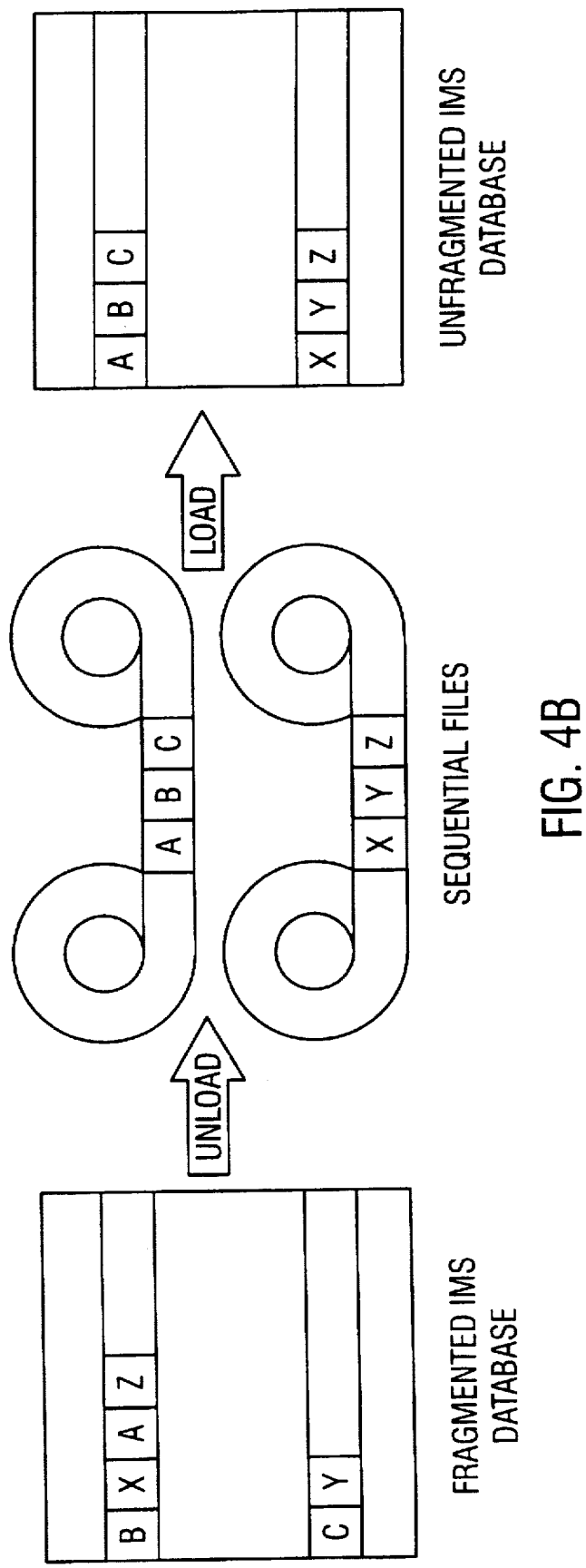
FIG. 4(b) is a high level block diagram of a reorganization of the database of FIG. 4(a).

After the number of sequential storage devices and unload processes are determined, the unload processes are initiated at block 215. FIG. 4(b) presents the reorganization process, which includes unloading and loading, of the database of FIG. 4(a). FIG. 4(b) shows that the unload processes copy the data contained in the (fragmented) IMS database to sequential files. As shown in FIG. 4(b), the sequential files are created by hierarchically unloading data from the IMS database. Thus, one sequential file contains the hierarchically ordered group A, B, and C. The other sequential file contains the hierarchically ordered group X, Y, and Z. In this case, the data was divided among the two sequential files by starting a new sequential file at each "root" level of the data. Alternatively, other division schemes may be used to allocate the hierarchical data among sequential files.

IMS supports two types of database access methods, a Hierarchical Directed Access Method (HDAM) and a Hierarchical Indexed Directed Access Method (HIDAM). If the database is an HDAM database, then it may be desirable to split the root addressable area (RAA) into pieces. While it will often be desirable to have the pieces be of approximately equal size, it will likewise be desirable to size the pieces so that they end on a physical cylinder boundary on the disk. The RAA pieces may be uniquely assigned to an unload process.

Providing Storage Space for the IMS Database

Temporary and permanent storage space is provided for the IMS database as shown at block 220. The temporary space is allocated during the unload process. The permanent storage space may be the same storage space that stored the IMS database before unloading, or it may be a separate storage space.

Assignment of Address Ranges in the Storage Space for Each Sequential File

At block 225, the address ranges are allocated for use by the various load processes in writing the sequentially stored data to a disk drive. The address ranges may be determined by estimating the size of the data records that each load process will write. In addition, the order in which the data must be written may be utilized to determine the address ranges. The ordering information may be determined from the information contained in the header data structure. Thus, given the estimated size and known sequence of the data to be written from the various sequential files, the estimated address ranges to be allocated among the sequential files can be readily determined.

Initiation of Parallel Load Processes At block 230, a plurality of load processes are initiated. These load processes execute concurrently. As shown in FIG. 4(b), the load process read data from the header data structure and write data from specified sequential files to the disk drive at the respective address ranges assigned to the specified sequential files.

The data writing operation may be performed by using standard hardware-level format writes, e.g., using CCW (channel command words) instructions. Alternatively higher-level MVS access methods, such as VSAM or QSAM may be used. However, using CCW permits data to be written concurrently to different locations of an empty database data set. Thus, multiple load processes can write data from their respective sequential files to the data set that will eventually be used as the reorganized DL/1database file.

Use of a higher-level MVS access method is analogous to dictating a letter to a secretary, who then types the letter in accordance with his or her previous training. In contrast, a hardware-level write is analogous to telling the secretary "move the cursor to the top of the page, then type the letters 'D e a r S i r,' then type a carriage return," and so forth.

A custom disk access method, independent of those provided by MVS, may be used to execute the format-write operations utilized by the various load processes. Development of such a disk access method is well documented in IBM System Programmers Reference SC26-4567. A format write is a hardware method of erasing all other data on a track while writing the track.

A load process establishes a "sequential point" in the disk space allocated for the database to be loaded. A sequential point is the place within the database where the associated load process begins writing sequentially to the disk. A sequential point may be farther into the database even before the previous parts of the database are written. A single load process may have several sequential points. Usually a HDAM database will have two sequential points while a HIDAM database often has only a single sequential point. The load process may send the blocks to be written to I/O driver routines. These driver routines create the required channel programs and collect a significant number of write requests in order to write large amounts of data to the disks in one burst. Error and status handling may be performed by the IO driver routines.

In order to ensure a valid database, several special cases may need to be handled. First, all granted disk areas except the last granted disk area may need to be formatted with empty blocks. The last granted disk area may be determined by synchronizing all tasks at the end. Thus, the last granted disk area may be formatted.

Another special case relates to format writes. As was discussed above, a format write is a hardware method of erasing all other data on the same track while writing. Thus, splitting a database into pieces could result in a situation that the beginning of one piece would be in the middle of a track. Writing blocks in such a piece may need to be delayed. This delay is needed because the write to the beginning of the track that may be preformed subsequently by another track would erase any previously written records.

Still another special case relates to database extent description and end of file notation. Typically, database extent description and end of file notation are handled by the native data management. However, if format writes are used, then software routines that handle database extent description and end of file notation may need to developed.

Typically, all database open and close requests are made by one process only. Because many load processes may be running concurrently, a service process may need to be provided to handle open and close requests.

Communication between the different load processes may be done by using "in-basket" technology in which each load process has its own separate basket. An optimal queuing method may be first-in-first-out (FIFO).

Handling of Data Overflow

Conventional overflow space may be allocated to the various load processes on an as-needed basis. The overflow space may be allocated one cylinder at a time to minimize disk-head movement of the disk being used for overflow space during data-writing operations. Using this approach, when a database record exceeds a predefined size, only a portion of the record is typically stored in a "regular" disk location. Storing the entirety of the record at that location can take up too much space on the disk and consequently may degrade disk performance in accessing other data records. Accordingly, when a database record exceeds a predefined size, only a portion of the record is stored in a "regular" disk location; the remainder is stored in an "overflow" disk location.

For example, if the database is a HDAM database, then the first root segment of each sequential file may define a physical data block in the target database. In some cases, the block may begin on a cylinder boundary. The sequential file may contain only database records that were randomized by HDAM to a unique section in the disk within the predefined range of cylinder boundaries and may never be used by any other segment for a different sequential file. In this example, the method would ensure that disk space is reserved for every load task in the RAA. The overflow disk locations may be granted to load processes one cylinder at a time to ensure that the overflow relative byte address and blocks are not used twice.

For a second example, if the database is a hierarchical indexed directed access method (HIDAM) database, then each sequential file may contain a complete key range. Thus, a root key will never be out of sequence. In this example, each load process may be granted a piece of the database. Further, if multiple load processes are being used, the primary indexes created by the load processes may be handled separately, with the primary index of the first load process being written to the primary-index dataset and the primary indexes of other load processes being initially stored in an intermediate file until being subsequently spooled to the primary-index dataset.

Implementation of One Embodiment of the Invention

Figure 1:
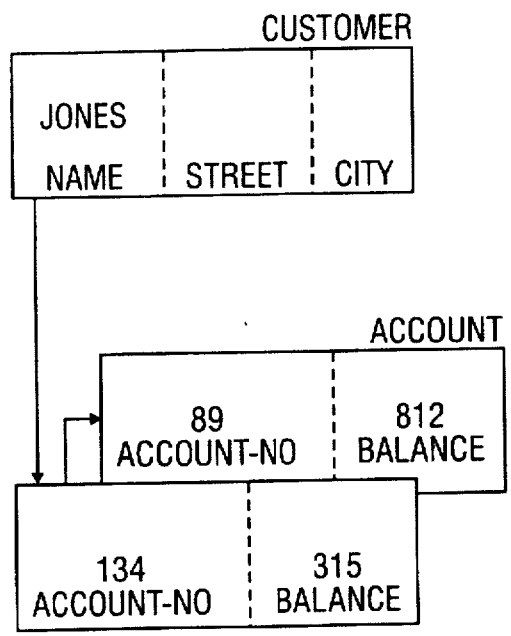
FIG. 1 is a block diagram of a simple hierarchical database.
Figure 5:
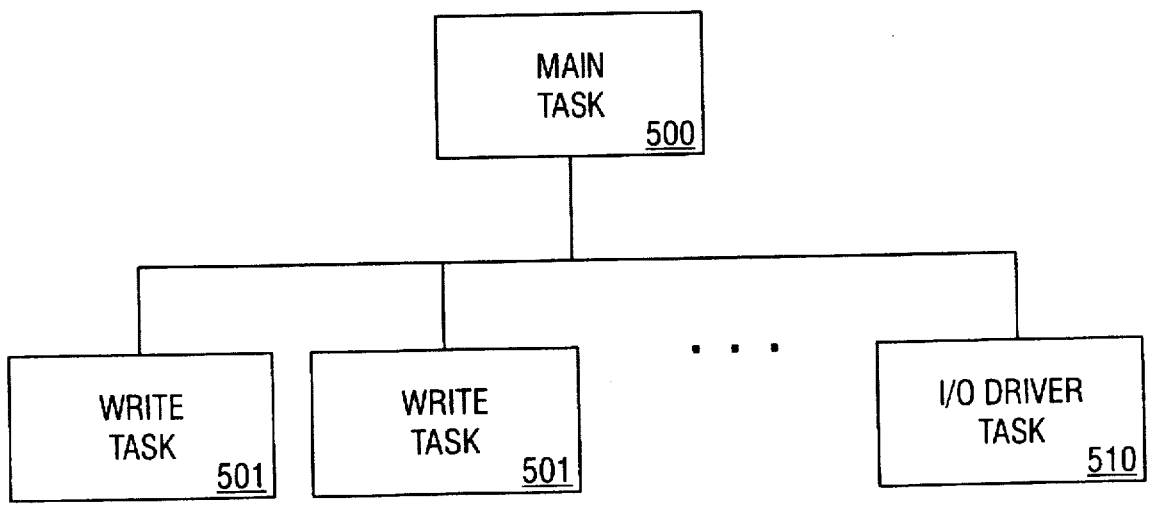
FIG. 5 is a high level block diagram of a task structure used by load and unload processes in accordance with the invention.

FIG. 5 shows a high-level block diagram of some key components used in a load process or an unload process. A main task 500 creates subtasks such as write tasks 501 (one per load process or unload process) and an I/O driver task 510 (one for all load processes or unload processes).

The description below first covers initialization and termination, because many programmers customarily set up initialization and termination routines first (initialization and graceful termination being two of the most important aspects of a computer program), followed by a discussion of what happens between initialization and termination.

Initialization of Load or Unload Processes

A basic module "stub" routine may be created during a common initialization routine. This module sets the initial I/O modules in a ready status. A public data area is then created which is called the I/O driver token. The termination task deletes this area and frees the stub routine.

When the need for a database sequential write is detected, the I/O driver token is activated. All required modules are then loaded and made available. The file names for these files are then added to the I/O file list. Next, the number of load tasks is determined and these tasks are created. Because the I/O driver token was previously activated, an I/O driver sub-task is created.

I/O Driver Task Initialization and Termination

The I/O driver task 510 is started by calling an execute object. The I/O driver creates the execute instance of its token. This token will be used during the I/O driver task operation. Additional modules are then called. A relative byte address (RBA) grant module is started. This module calculates the starting RBA and the RBA increment for every database to be found in the DDname list. Next, a "to be delayed" storage area is prepared for those writes that do not start at the beginning of a physical track. Then a task communication interface is opened. At this point, the I/O driver service task is ready for work. It waits for requests to be shipped by the writer tasks.

A termination process then frees up all the storage obtained during the initialization time. A special check is done for error recovery situations since errors during the execution phase will drive the termination process. However, a "normal completion" termination is to be avoided.

Write Task Initialization and Termination

Each load process uses its associated write task 501 to write data to disk. The write tasks need to obtain the data buffer that is used during the I/O process. Because one cylinder is written at a time, significant virtual storage is required. However, this is not a significant problem as storage requests may be obtained above the 16 Mb line.

Next, the logical interface that connects each load process to the I/O driver task 510 is opened. At this time, the interface to the I/O driver task 510 is established. The maximum number of sequential sets for this write task is defined. A request is scheduled for the I/O driver task 510 to open the database file. The I/O driver task 510 then returns the address of an extent table. This table is used by the channel program generator to create the channel commands words during write operations. The write task 501 is now ready for work.

Overall Termination

A close request is scheduled from a write task 501 of a load process through the logical interface with the I/O driver task 510. The write task 501 first checks to ensure that all outstanding I/O operations have been finished and if not, causes them to be completed. A close request is then transmitted to the I/O driver task 510, which completes the close request. Next, all main storage obtained during initialization is freed. If the operation was successful, processing is continued. Otherwise, the error is handled.

Open Processing

Write Sub-task Processing of Open Requests

A load process's request to open a database file is generated by the associated write task 501 and sent to the I/O driver task 510 via the logical interface. After the I/O driver task 510 has finished its work, the I/O routines associated with that write task 501 create a physical I/O interface to the disk. Next, the maximum number of sequential sets, the number of channel program blocks per sequential set, and the number of tracks per channel program block are defined by the write task. The physical I/O routines are then called to obtain the storage for these blocks and to initialize them. The caller specifies the lowest RBA. This enables presetting the first sequential set and channel program block.

I/O Driver Task Processing of Open Requests

The open process for a new database file is performed by the I/O driver task 510 in response to a request for open from a write task 501. The first open request for the specified file actually leads to the file being opened; subsequent requests from other write tasks pick up the result from the first open.

An IBM-standard data control block referred to as the DCB is created for processing. The file name is moved to the DCB and the DCB is opened for output. A subsequent DCB is created for every volume of this file and opened for update. A cross volume extent description may now be created. The cross volume extent description depicts the number of records available in every physical extent of the file. Several control blocks are then created. The first control block is a file control table. This table is anchored from the IBM-standard DDname list. There is one table per open file. Next, a volume table is created. This table is pointed to by the file control table. Multi-volume files have multiple entries. Further, these tables are chained. Next, an extent table is created. This table is pointed to by the file control table and the volume table. The extent table points back to the volume table and the file control table. Every extent on any disk of this file creates one entry. The entries are chained in ascending order. Next, an overall DCB table and a Volume DCB table are created. The overall DCB address resides in the file control table and the volume DCB address resides in the volume table.

The open routines may be partially reused when a database extends. This may be done using callable services.

Close Processing

Processing by Write Sub-task

When a load process has completed its work, the associated write task 501 checks to ensure that all of its outstanding I/O requests have been processed (and causes them to be processed if no), then issues a request that the database file be closed, referred to as a close request. The close request is processed by the I/O driver task 510.

I/O Driver Task Processing

When a close request is received from a write task 501, the I/O driver task 510 checks whether the request is from the last remaining write task (i.e., whether all other load processes have already finished their work). If not, the highest block (RBA) written by the closing write task 501 is retained for future use and the logical connection between that task 501 and the I/O driver task 510 is terminated. The open count maintained by the I/O driver task is then decremented by one.

On the other hand, if the closing write task was this was the last task (i.e., the open count is equal to 1) then the file is physically closed. The first step in closing the file is to determine the overall highest block (RBA). The queue is examined for deferred writes. Recall that those writes were deferred because they did not begin at the beginning of a track. All those blocks may now be written since the preceding blocks are not written to their respective tracks. After these blocks are written, the file is complete. We now do the close and specify the highest block written. This will set the "high used" marker in the MVS file descriptions (VTOC catalog). The newly reorganized database is now ready to be used.

End of Extent and Volume Processing

Write Sub-task Processing

A write request from a write task 501 may be denied by the operating system for "out of extent" reasons. If this is the case, the write task 501 generates a request to extend the file for processing by the I/O driver task 510. After the file is extended, the failed channel program block is resubmitted by the write task 501 to the I/O driver task 510.

I/O Driver Task Processing

A request to extend a file is received by the I/O driver task 510 from a write task 501 (e.g., by a callable interface such as the IBM Media Manager). If IMS's overflow sequential access method (OSAM) is used, an open/close/end-of-extent routine is called to handle this request. However, if the request may be satisfied using the current disk space allocation (e.g., space left over after completion of another write task 501), then the open/close/end-of-extent routine need not be called.

If the request is for the last volume, we "silence" the I/O to this volume by waiting until no more I/O is queued to that volume. The overall DCB is used to drive an end-of-volume (EOV) supervisor call (SVC). If the request cannot be satisfied, this SVC issues a fatal-error code x37 ABEND. The extent table is then updated. If the request is satisfied, control is returned to the requesting write task 501; otherwise, the foregoing operations are is repeated until the request is satisfied.

The load or unload process may request a switch to a new disk volume. If this occurs, new control blocks are created for the new disk volume in a manner similar to the operations described above for processing of an open request.

Write Processing

Processing by Write Task

A load process submits a data block to be written to disk by passing the block address and its RBA to the associated write task 501. The write task collects a series of such data blocks in a logical "container," so to speak, identified by a channel program block (CPB). When a desired number of blocks has been collected (preferably a full cylinder's worth of data), submits write requests to the I/O driver task 510, which initiates the actual physical data write operation(s).

Processing by I/O Driver Sub-task

The I/O driver task 510 receives a channel program block from a write task 501 and initiates standard operating-system I/O on the data referred to by the CPB using EXCP (i.e., SVC 0). The CPB is queued on the volume block. There is no need to wait for the I/O completion.

Format Writes

Each load process must format the remainder of the most recent disk area (extent) granted to it. This is done by sending the data block and a "format" indicator to its associated write task 501. Those format blocks have to be written to the database file except for the most recent extent of that file. The first format write will result in a request from the write task 501 to the I/O driver task 510 to synchronize the file. The I/O driver task will wait until all write tasks have issued their synchronize requests. The most recent extent can now be determined. All tasks are then resumed. The "format write requests" are now executed like normal writes except for the task with the most recent extent (for which format writes are ignored).

Data Areas

Example formats for data areas that may be used when implementing the above method follow:

DDname List (one per database file)

| DDNLIST | DSECT | | |
|---|---|---|---|
| DDN_NEXT | DS | A | next ddname |
| DDN_ACCESS | DS | C | access intent |
| DDN_ACC_IN | EQU | C'I' | input only |
| DDN_ACC_OUT | EQU | C'O' | output |
| DDN_METHOD | DS | C | access method |
| DDN_DBDBLKZ | DS | XL2 | blksize/cisz in DBD |
| DDN_DDNAME | DS | CL8 | ddname |
| DDN_DBDNAME | DS | CL8 | dbdname |
| DDN_DSINFO | DS | A | dataset attributes area |

DDname List (one per database file) -continued

| DDNLIST | DSECT | | |
|---|---|---|---|
| DDN_OPENCNT | DS | F | open count |
| DDN_OFLDS | DS | A | RBA grant area pointer |
| DDN_HDAMRAA | DS | F | HDAM raa size |
| DDN_HIGHRBA | DS | F | highest RBA |

Sequential Set (points to database)

| SEQSET | DSECT | | |
|---|---|---|---|
| SEQ_NEXT | DS | A | next seqset |
| SEQ_SEQID | DS | F | seqset id |
| SEQ_EXTNTAD | DS | A | extent address |
| SEQ_CCHHR | DS | 0X16 | |
| SEQ_CCHH | DS | XL4 | current CCHH |
| SEQ_RECNO | DS | XL2 | current record |
| SEQ_EXTNO | DS | X | relative extent no. |

Channel Program Block (built by each load process)

| CPB | DSECT | | |
|---|---|---|---|
| CPB_LL | DS | AL4 | length |
| CPB_EYECT | DS | CL8 | eye catcher |
| CPB_IDENT | DS | CL1 | * |
| CPB_TYPE | DS | X | type of cpb |
| CPB_TYPE_IN | EQU | 1 | input cpb |
| CPB_TYPE_OUT | EQU | 2 | output cpb |
| CPB_FLAG1 | DS | X | flag byte (status) |
| CPB_F1_BUSY | EQU | X'80' | IO busy |
| CPB_F1_STRT | EQU | X'40' | IO started (by iodriver) |
| CPB_F1_COMP | EQU | X'20' | IO complete |
| CPB_F1_DATA | EQU | X'10' | blocks chained not yet written |
| CPB_F1_UEX | EQU | X'08' | unit exception (on read) |
| CPB_FLAG2 | DS | X | flag byte (features) |
| CPB_F2_ECKD | EQU | X'80' | device handles eckd |
| CPB_F2_LR3T | EQU | X'40' | set locate record every 3 tracks |
| CPB_NEXT | DS | A | next cpb |
| CPB_IOCHAIN | DS | A | IO chain |
| CPB_VOLBLKA | DS | A | address of volume block |
| CPB_ECB | DS | F | ecb |
| CPB_IDALIST | DS | A | top of IDA list for this cpb |
| CPB_SEEKLIST | DS | A | top of seek head list |
| CPB_TIME | DS | F | time work field |
| CPB_NXTCCW | DS | A | next free CCW slot |
| CPB_NXTIDAW | DS | A | next (free if write) IDAL slot |
| CPB_NXSEEK | DS | A | next free seek head slot |
| CPB_FROMCCHH | DS | F | CCHH of first block |
| CPB_TOCCHH | DS | F | CCHH of last block |
| CPB_FROMREC | DS | X | Record of first block (−1) |
| CPB_SEARCH | DS | XL5 | search R0 data |
| CPB_EXTNO | DS | X | extent index |
| | DS | X | |
| CPB_INTREC | DS | 0D | iodriver interface record |
| | DS | 10F | |
| CPB_IOB | DS | 10F | IOB |
| CPB_CCWS | DS | 0D | start of ccws |

Volume Block

| VOLUME | DSECT | | |
|---|---|---|---|
| VOL_NEXT | DS | A | next volume |
| VOL_VOLSER | DS | CL6 | volume serial |
| VOL_EXTENTS | DS | XL2 | extents on volume |
| VOL_FIRSTEX | DS | A | first extent |
| VOL_DCBADDR | DS | A | dcb for this volume |

-continued

Volume Block

| VOLUME | DSECT | | |
| --- | --- | --- | --- |
| VOL_IOCHAIN | DS | A | cpbs chained to this volume |
| VOL_DDNAME | DS | CL8 | ddname used for this volume |
| VOL_ALLOC | DS | XL4 | allocated tracks |
| VOL_USED | DS | XL4 | used tracks |
| VOL_LOCKWORD | DS | F | |
| VOL_FLAGS | DS | X | flags |
| VOL_FL_ECKD | EQU | X'80' | volume can handle ECKD |

Extent Block

| EXTENT | DSECT | | |
| --- | --- | --- | --- |
| EXT_NEXT | DS | A | next extent |
| EXT_VOLADDR | DS | A | address of volume block |
| EXT_FROMCCHH | DS | XL4 | from CCHH |
| EXT_TOCCHH | DS | XL4 | to CCHH |
| EXT_BLOCKS | DS | XL4 | blocks in this extent |
| EXT_EXTNO | DS | X | relative extent no. |

IO Driver Requests

| IODREEQ | DSECT | | | |
| --- | --- | --- | --- | --- |
| REQ_FUNCODE | DS | F | function code | |
| | | | valid functions are | |
| | | | GET | grant set of RBAs or query last grant |
| | | | OPEN-IN | connect to file blocks |
| | | | OPEN-OUT | conect to file blocks |
| | | | CLOSE | disconnect from file blocks |
| | | | EXTEND | extend a dataset |
| | | | PUT | schedule a cpb |
| | | | SYNC | synchronize tasks |
| REQ_CPBADDR | DS | A | cpb address (put) | |
| REQ_INTECB | DS | A | ecb (all except put) | |
| REQ_DDNAME | DS | CL8 | ddname (all functions) | |
| | DS | 3F | depending on request type | |
| REQ_RETCODE | DS | F | return code | |
| REQ_RSNCODE | DS | F | reason code | |

Program Storage Device

Any of the foregoing variations may be implemented by programming a suitable general-purpose machine having appropriate hardware. The machine may comprise a single computer. Alternatively, the machine may comprise a plurality of computers connected by a communications link such as an RS-232 link or a network; the computers may be linked in, e.g., a parallel-processing arrangement or a client-server arrangement.

The programming may be accomplished through the use of a program storage device readable by the machine and encoding a program of instructions executable by the machine for performing the operations described above. The program storage device may take the form of, e.g., one or more floppy disks; a CD ROM or other optical disk; a magnetic tape; a read-only memory chip (ROM); and other forms of the kind well-known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions is immaterial here.

In the following claims, lettering is used to identify subparagraphs solely for convenient reference and not to indicate the order in which method operations are performed unless expressly indicated otherwise. For example, labeling of two operations in a claim as subparagraphs (b) and (c) is not intended to limit the claim to performance of those operations in that particular order.

It will be appreciated by those of ordinary skill having the benefit of this disclosure that the illustrative embodiments described above are capable of numerous variations without departing from the scope and spirit of the invention. Accordingly, the exclusive rights sought to be patented are as described in the claims below.

What is claimed is:

1. A method, executed by a machine, of reorganizing an IMS database having a hierarchical structure, comprising:

(a) creating, in a storage device, a header data structure containing information about the size and hierarchical structure of the database;

(b) determining a number of sequential files in which to partition the database to be used for temporary storage of data from the database;

(c) determining a desired number of unload processes to be used in parallel in unloading the database;

(d) initiating the desired number of unload processes to copy data from the database to one or more sequential files so that hierarchically-related data in the database is copied in sequence;

(e) providing a storage space to contain the database, said storage space having a plurality of addresses;

(f) assigning respective address ranges of the storage space to the sequential files; and (g) initiating a plurality of load processes to execute concurrently, the load processes being assigned to write data from one or more specified sequential files to the storage space at the respective address ranges assigned to the specified sequential files.

2. The method of claim 1 wherein the hierarchical structure in the data is determined by consulting DBDLIB, VTOC and MASTER CATALOG.

3. The method of claim 1 wherein the number of sequential files is specified by a user.

4. The method of claim 1 wherein the number of sequential files is determined, at least in part, based on the aggregate size of the data in the IMS database.

5. The method of claim 1 wherein the number of sequential files is limited to a maximum number.

6. The method of claim 1 wherein the number of unload process is equal to the number of sequential files.

7. The method of claim 1 wherein at least a portion of the storage space previously stored the IMS database.

8. The method of claim 1 wherein the address ranges are determined, at least in part, by estimating the size of the data records that at least one of the plurality of load process will write.

9. The method of claim 1 wherein the address ranges are determined, at least in part, by the order in which the data will be written by the load processes.

10. The method of claim 1 wherein the data is written with standard hardware-level format writes.

11. The method of claim 1 wherein the load processes write data into at least one regular disk location and at least one overflow disk location.

12. A method, executed by a machine, of unloading an IMS database having a hierarchical structure, comprising:
 (a) creating, in a storage device, a header data structure containing information about the size and hierarchical structure of the database;
 (b) determining a number of sequential files in which to partition the database, to be used for temporary storage of data from the database;
 (c) determining a desired number of unload processes to be used in parallel in unloading the database; and
 (d) initiating the desired number of unload processes to copy data from the database to one or more sequential files so that hierarchically-related data in the database is copied in sequence.

13. The method of claim 12, wherein a separate sequential file is used for each record in the database.

14. A method, executed by a machine, of loading a partitioned IMS database having a hierarchical structure, comprising:
 (a) providing a plurality of sequential files comprising the partitioned database, each containing data to be loaded into the database, the data in each sequential file being organized so that hierarchically related data is stored sequentially in the sequential file;
 (b) providing a header data structure in a storage device, said header data structure containing information defining the organization of hierarchical data within the plurality of sequential files;
 (c) providing a storage space to contain the partitioned IMS database, said storage space having a plurality of addresses;
 (d) assigning respective address ranges of the storage space to the sequential files; and
 (e) initiating a plurality of load processes to execute concurrently, the load processes being assigned to write data from one or more specified sequential files to the storage space at the respective address ranges assigned to the specified sequential files.

15. The method of claim 14, wherein each sequential file contains data from a single database record.

16. A program storage device readable by the machine of a specified one of claims 1 through 15 and containing instructions for performing the method contained in said specified claim.

* * * * *